Feb. 27, 1940.  J. J. NELSON  2,191,579
AIR HOSE CONNECTION
Filed Sept. 9, 1937
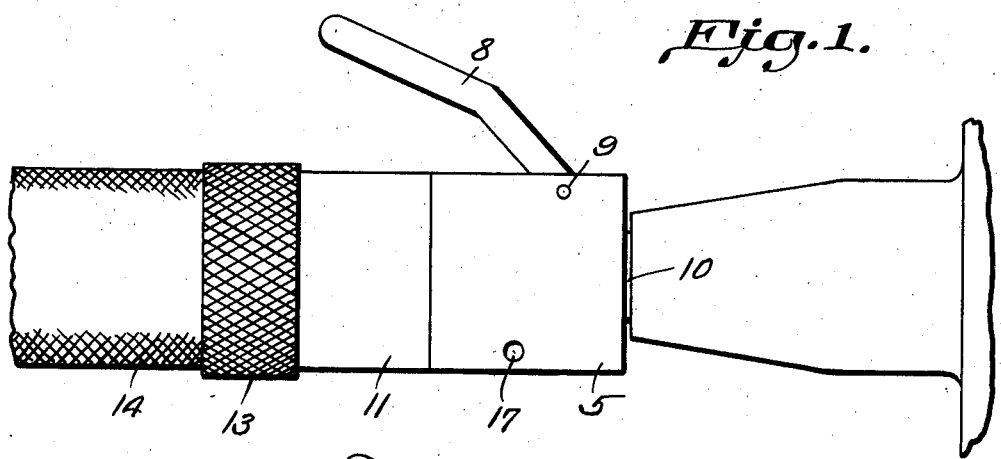
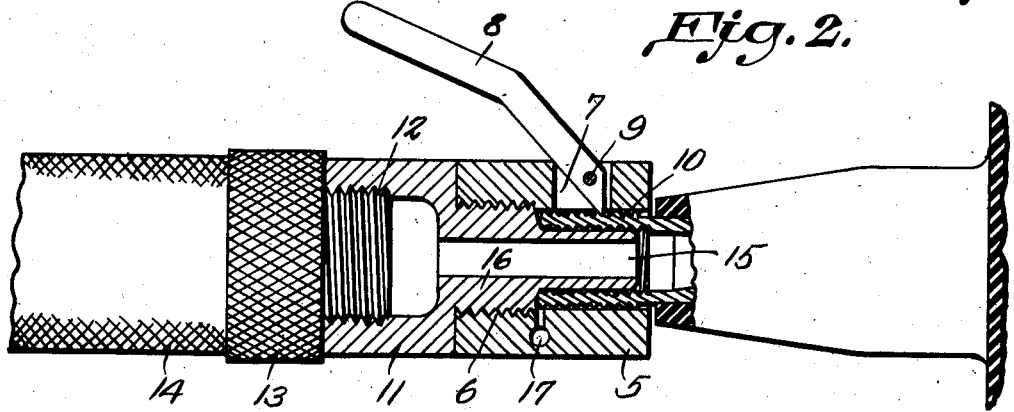
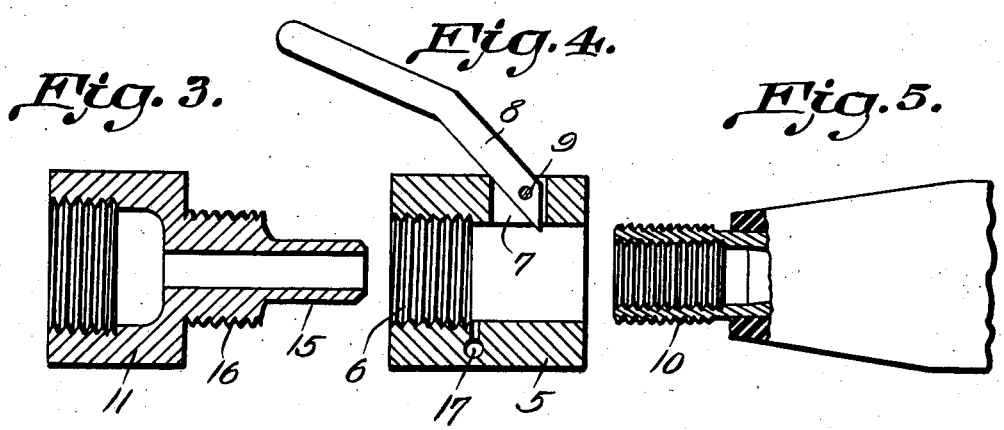
John J. Nelson
INVENTOR.
BY *C. A. Snow & co.*
ATTORNEYS.

Patented Feb. 27, 1940

2,191,579

UNITED STATES PATENT OFFICE 2,191,579

AIR HOSE CONNECTION

John J. Nelson, Birmingham, Ala.

Application September 9, 1937, Serial No. 163,122

1 Claim. (Cl. 285—170)

This invention relates to an improved air hose connection, the primary object of the invention being to provide a quick acting connection which may be readily and easily operated, and one which will securely hold the air hose to the stem or tube with which it is used.

An important object of the invention is to provide a connection especially designed for use in curing inner tubes of pneumatic tires, the connection being one which will insure the free passage of air to the valve and one which will insure against leaks which usually cause a blast of air to be directed against the lug of the mold resulting in the cooling of the lug and the effective curing of the tube.

With the foregoing and other objects in view, which will appear as the description proceeds, the invention resides in the combination and arrangement of parts and in the details of construction hereinafter described and claimed, it being understood that changes in the precise embodiment of the invention herein described, may be made within the scope of what is claimed, without departing from the spirit of the invention.

Referring to the drawing:

Figure 1 is an elevational view of a hose connection constructed in accordance with the invention.

Figure 2 is a view of the air hose coupling partly in section.

Figure 3 is a sectional view through one of the end members of the connection.

Figure 4 is a sectional view through the central section of the coupling.

Figure 5 is a sectional view through the valve with which the coupling is used.

Referring to the drawing in detail, the hose coupling, which is of the quick acting type, includes a central section 5 which is tubular in formation and formed with internal threads 6. An opening 7 is formed in the central section 5 and accommodates the lever 8, which is pivotally mounted on the pin 9 that extends across the opening 7.

As shown, the inner end of the lever 8 is beveled providing a sharp end adapted to engage within the threads of the valve stem 10 of the inner tube being cured and since the lever 8 is mounted laterally of a vertical line drawn intermediate the ends of the opening 7, it will be seen that when the coupling is being positioned over a valve stem, the lever may be swung from the position shown in the drawing to a position wherein the pointed end of the lever will lie within the opening 7. It follows that upon reverse movement of the lever 8 the pointed end thereof will be wedged against the threads of the valve stem holding the coupling in position.

The reference character 11 designates the air hose nozzle which is formed with internal threads to receive the threaded extension 12 of the nipple 13, secured to the air hose 14. This nozzle 10 includes an extension 15 having an enlarged portion 16 which is provided with external threads that cooperate with the internal threads 6, in securing the nozzle 11 in the central section. Due to the construction of the nozzle, it will be obvious that when the nozzle is positioned within the central section 5, the end thereof will extend into the valve stem 10, as shown by Figure 2 of the drawing. An opening 17 is provided in the central section 5, which opening establishes communication between the interior of the central section and atmosphere, the opening being normally closed when the elements of the coupling have been properly connected, however, should the coupling become slightly loose, the air which would otherwise be directed against the curing mold cooling the mold, will be directed laterally away from the mold.

From the foregoing it will be seen that due to the construction shown and described, an air hose may be readily and securely connected with the valve stem of an inner tube being cured with the result that the coupling will not become displaced, when air pressure is directed to the tube.

I claim:

A coupling for connecting an air hose to a valve stem comprising in combination, a hollow nozzle section adapted to be secured to the air hose, said nozzle section having an opening in the wall thereof, a lever pivotally mounted within the opening at a point adjacent to the forward end of the opening, the inner end of the lever adapted to engage the threads of the valve stem over which the nozzle section is positioned at a point in advance of the pivot point of the lever, whereby air pressure directed to the valve stem acts to force the coupling rearwardly and wedge the inner end of the lever into engagement with the threads of the valve stem and force the lever against one edge of the opening, securing the coupling on the valve stem.

JOHN J. NELSON.